United States Patent
Kim et al.

(10) Patent No.: US 10,698,506 B2
(45) Date of Patent: *Jun. 30, 2020

(54) INPUT SYSTEM AND METHOD FOR DETECTING TOUCH USING THE SAME

(71) Applicant: LG Display Co., Ltd., Seoul (KR)

(72) Inventors: Sung-Chul Kim, Goyang-si (KR); Sang-Hyuck Bae, Paju-si (KR); Sung-Su Han, Goyang-si (KR); Do-Young Jung, Seoul (KR)

(73) Assignee: LG Display Co., Ltd., Seoul (KR)

( * ) Notice: Subject to any disclaimer, the term of this patent is extended or adjusted under 35 U.S.C. 154(b) by 44 days.

This patent is subject to a terminal disclaimer.

(21) Appl. No.: 15/960,357

(22) Filed: Apr. 23, 2018

(65) Prior Publication Data

US 2018/0239451 A1    Aug. 23, 2018

Related U.S. Application Data

(62) Division of application No. 14/878,987, filed on Oct. 8, 2015, now Pat. No. 9,977,517.

(30) Foreign Application Priority Data

Oct. 23, 2014 (KR) .......................... 10-2014-0144189
Jan. 28, 2015 (KR) .......................... 10-2015-0013719

(51) Int. Cl.
*G06F 3/033* (2013.01)
*G06F 3/0354* (2013.01)
(Continued)

(52) U.S. Cl.
CPC ........ *G06F 3/03545* (2013.01); *G06F 3/0383* (2013.01); *G06F 3/044* (2013.01); *G06F 3/0416* (2013.01)

(58) Field of Classification Search
CPC .............................. G06F 3/03545; G06F 3/044
See application file for complete search history.

(56) References Cited

U.S. PATENT DOCUMENTS 7,233,272 B1 * 6/2007 Yen ....................... G09G 3/3688
                                                                341/144
2012/0218199 A1 * 8/2012 Kim ....................... G06F 3/0412
                                                                345/173

(Continued)

FOREIGN PATENT DOCUMENTS

CN            102955637            3/2013

OTHER PUBLICATIONS

First Office Action for Chinese Patent Application No. CN 201510691512, dated Dec. 8, 2017, 20 pages, (With English Translation).

(Continued)

*Primary Examiner* — Hang Lin
(74) *Attorney, Agent, or Firm* — Fenwick & West LLP

(57) ABSTRACT

An input system includes an input pen for interfacing with a touchscreen of a display panel. The input pen includes a conductive tip. A switching unit of the pen connects the conductive tip to a receiving unit and a driving unit. The receiving unit receives touchscreen driving signals from the touchscreen through the conductive tip. The driving unit generates pen driving signals transferred to the touchscreen through the conductive tip. The input pen also include a signal processing unit to calibrate timing of the pen driving signal by synchronizing the pen driving signal with the touchscreen driving signal. To enable touch detection, the conductive tip is positioned to contact or approach the touchscreen, the touchscreen driving signal is received from the touchscreen via the conductive tip. The pen driving signal is generated and transferred to the touchscreen via the conductive tip.

20 Claims, 12 Drawing Sheets

(51) Int. Cl.
*G06F 3/044* (2006.01)
*G06F 3/038* (2013.01)
*G06F 3/041* (2006.01)

(56) References Cited

U.S. PATENT DOCUMENTS

| | | | |
|---|---|---|---|
| 2013/0106797 A1* | 5/2013 | Pant | G06F 3/0383 345/179 |
| 2013/0207926 A1* | 8/2013 | Kremin | G06F 3/0383 345/174 |
| 2014/0125626 A1* | 5/2014 | Yang | G02F 1/134336 345/174 |
| 2015/0029136 A1* | 1/2015 | Shahparnia | G06F 3/044 345/174 |
| 2015/0070293 A1* | 3/2015 | Yu | G06F 3/044 345/174 |

OTHER PUBLICATIONS

United States Office Action, U.S. Appl. No. 14/878,987, dated Oct. 10, 2017, 29 pages.
United States Office Action, U.S. Appl. No. 14/878,987, dated Jun. 13, 2017, 29 pages.

* cited by examiner

FIG. 14
Comparator Output
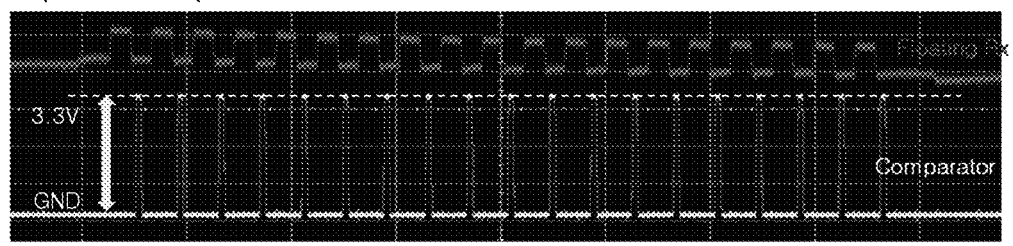
2nd Amplifier Output
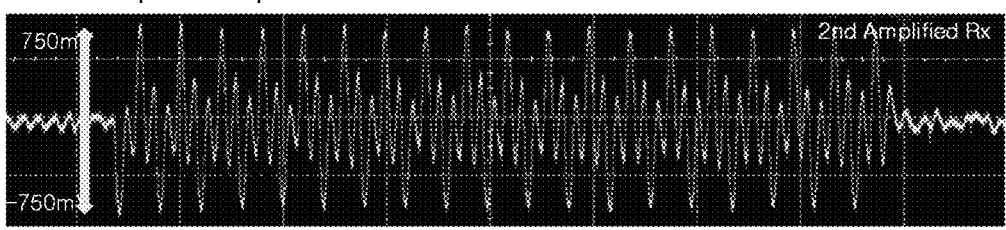
1st Amplifier Output
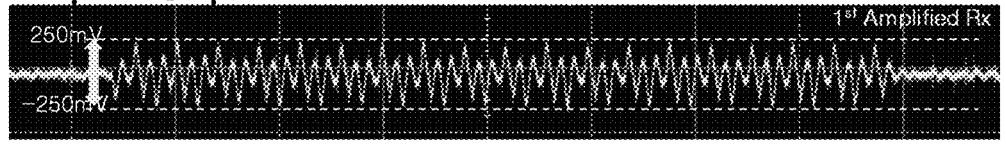
Receiving Buffer Output (Rx Sensing Pulse)
Ts
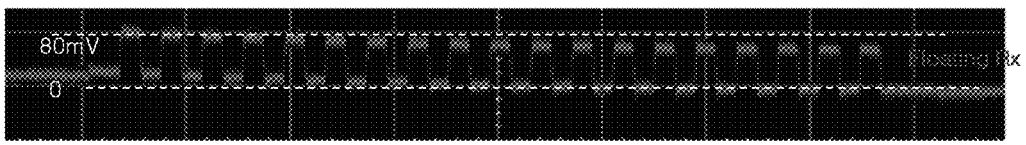

INPUT SYSTEM AND METHOD FOR DETECTING TOUCH USING THE SAME

CROSS-REFERENCE TO RELATED APPLICATIONS

This application is a divisional of U.S. patent application Ser. No. 14/878,987, filed on Oct. 8, 2015, which claims the benefit of the Korean Patent Application No. 10-2014-0144189, filed on Oct. 23, 2014, and the Korean Patent Application No. 10-2015-0013719, filed on Jan. 28, 2015, each of which are hereby incorporated by reference in their entirety.

BACKGROUND

Field of the Invention

The present invention relates to an input system and, more particularly, to an input system capable of enhancing input detection accuracy and a method for detecting touch using the same input system.

Discussion of the Related Art

In recent years, a variety of flat display devices having improved slimness, lightness, and power consumption have been developed as replacements for existing cathode ray tube (CRT) display devices.

Representative examples of such flat display devices include liquid crystal display (LCD) devices, plasma display panel (PDP) devices, field emission display (FED) devices, electroluminescent display (ELD) devices, and the like. Such flat display devices include a flat display panel to render an image. A flat display panel has a structure in which two transparent insulating substrates facing each other are joined with a layer made of a material having inherent light emitting properties or optical anisotropy interposed between the substrates.

Recently, there has been increasing demand for a touch panel capable of recognizing a touch area through a finger of the user or a separate input means, and of transmitting separate information corresponding to the touch area in order to add such a touch panel to a display device configured as mentioned above. Currently, such a touch panel is applied to a display device by attaching the touch panel to an outer surface of the display device.

In accordance with touch sensing methods, example types of touch panels include a resistive touch panel, a capacitive touch panel, and an infrared sensing touch panel. In recent years, the capacitive touch panel has increased in popularity due to its sensitivity and convenient manufacturing process.

Meanwhile, human interface devices (HIDs) included in smartphones or smartbooks have increased in popularity as mobile devices increasingly support stylus pens enabling writing or drawing with the mobile device as well as touch inputs through fingers. A stylus pen provides more precise input compared to touch inputs through fingers, and a stylus pen supports functions such as precise picture drawing and character writing.

However, the stylus pen may include a separate sensor and a separate electrode in addition to the electrode included in a touch panel to enable recognition of inputs. For this reason, an increase in the number of processes and costs may occur.

In a device in which a touch panel is attached to a display panel, addition of electrodes and sensors may be easily achieved. However, in a device in which a touch panel is inside of a display panel in an integrated manner together with a pixel array, adding an extra electrode and sensor may be difficult. In this case, driving of the touch panel may influence driving of the display panel. For this reason, such electrode and sensor addition may be impractical.

SUMMARY

Accordingly, the disclosed embodiments are directed to an input system and method for detecting touch using the same that substantially obviate one or more problems due to limitations and disadvantages of the related art.

The disclosed embodiments include a touchscreen input system integrated with a display panel having an in-cell type structure and beneficially enhancing detection accuracy without adding an electrode for an input pen, as well as a method for detecting touch using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the various advantages of the disclosed embodiments, as broadly described herein, an input system includes a display panel having a touchscreen including a plurality of touch detection electrodes, and an input pen including a conductive tip; a switching unit connected to the conductive tip; a receiving unit coupled to the switching nit and configured to receive a touchscreen driving signal from the touchscreen through the conductive tip; a driving unit coupled to the switching unit and configured to generate a pen driving signal transferred to the conductive tip through the switching unit; and a signal processing unit coupled to the receiving unit and driving unit and configured to calibrate timing of the pen driving signal to synchronize the pen driving signal with the touchscreen driving signal. The display panel is configured to detect contact or approach of the input pen in response to the pen driving signal.

The input pen may include a housing accommodating the switching unit, the receiving unit, the driving unit and the signal processing unit therein while exposing a portion of the conductive tip.

When the conductive tip contacts or approaches the display panel, the conductive tip may be coupled to a selected one of the touch detection electrodes, which is disposed in a region where the conductive tip contacts the display panel or is positioned close to the conductive tip, so the conductive tip receives the touchscreen driving signal.

The driving unit may be configured to generate the pen driving signal according to a timing calibration from the signal processing unit after a predetermined time elapses from reception of the touchscreen driving signal, and the conductive tip transfers the pen driving signal to the display panel.

The signal processing unit may be configured to initiate a switching period in response to reception of the touchscreen driving signal, where the switching unit is configured to begin transmitting the pen driving signal from the driving unit to the conductive tip after the switching period.

The input pen may further include a pressure sensor physically connected to the conductive tip to sense a pressure applied to the conductive tip and to transfer the sensed pressure to the signal processing unit.

The signal processing unit may be configured to output a pen driving signal that has a same period as the touchscreen driving signal and that has either a same phase as the touchscreen driving signal or an inverted phase relative to the touchscreen driving signal.

The signal processing unit may be configured to time divide a touch period of the display panel into a pen sensing period and a pen driving period, where the signal processing unit is configured to control the switching unit to transfer the touchscreen driving signal from the conductive tip to the receiving unit during the pen sensing period and to transfer the pen driving signal to the conductive tip during the pen driving signal generation period. The pen signal generation period within the touch period may be longer than the pen sensing period within the touch period.

The receiving unit may include an amplifier configured to amplify the touchscreen driving signal sensed through the switching unit as well as a comparator configured to output a digital pen sensing signal having a digital level in response to comparison of the amplified touchscreen driving signal from the amplifier to a threshold value. The driving unit and/or signal processing unit may be configured to generate the pen driving signal in response to the digital pen sensing signal.

The signal processing unit may receive the digital pen sensing signal from the comparator, and may output a pen driving signal timing-synchronized with the touchscreen driving signal. In other words, the pen driving signal may have the same period as the touchscreen driving signal.

The driving unit may include a level shifter configured to convert the digital pen driving signal received from the signal processing unit into an analog drive voltage signal corresponding to the digital level of the pen driving signal, and the driving unit may be configured to output the analog drive voltage signal.

The comparator may be configured to output the digital pen sensing signal in response to the amplified touchscreen driving signal being greater than or equal to the threshold value. Alternatively, the amplifier may be an inverting amplifier and the comparator may be configured to output the digital pen sensing signal in response to the amplified touchscreen driving signal being less than the threshold value.

The input pen may further include a power supply connected to the signal processing unit while being accommodated in the housing, to supply power.

The input pen may further include an input/output interface connected to the power supply while protruded from an outer surface of the housing.

In another aspect, a method for detecting touch using an input system includes positioning a conductive tip of the input pen to contact or approach a display panel including a touchscreen; receiving, via the conductive tip, a touchscreen driving signal from a touchscreen region where the input pen contacts or approaches the touchscreen in response to coupling of the conductive tip to the touchscreen region; generating, within the input pen, a pen driving signal synchronized with the touchscreen driving signal received from the touchscreen region; and transferring the pen driving signal to the touchscreen via the conductive tip, the display panel configured to detect touch or approach of the input pen in response to the pen driving signal.

The method may include turning on the input pen having a conductive tip protruding from the input pen.

The conductive tip may repeatedly receive the touchscreen driving signal via the conductive tip and transfer the pen driving signal via the conductive tip. For example, the input pen alternately receives the touchscreen driving signal and transfers the pen driving signal using time division at the conductive tip.

The display panel may generate a touch enable signal for dividing each frame into a display period and a touch period, which alternate with each other at least one time per each frame. The touchscreen may generate a plurality of touch drive signals for the touchscreen during the touch period. The input pen may time-divide the touch period to receive the touchscreen driving signal during in an initial portion of the touch period and to transfer the pen driving signal in a remaining portion of the touch period having a longer duration than the initial portion of the touch period.

The touchscreen driving signal reception may include receiving the touchscreen driving signal via the conductive tip, amplifying the received signal using an amplifier included in the input pen, and outputting a digital pen sensing signal in response to comparing the amplified touchscreen driving signal with a threshold value. The pen driving signal may be generated in response to the pen sensing signal.

The pen driving signal may be generated at least one period of the touchscreen driving signal after outputting the digital pen sensing signal.

The pen driving signal generation may be achieved by processing the signal received via the conductive tip for a predetermined time, thereby initializing timing of the pen driving signal.

Generating the pen driving signal may include generating the pen driving signal having a same period as the touchscreen driving signal and either a same phase as the touchscreen driving signal or an inverted phase relative to the touchscreen driving signal.

The method may further include sensing a variation in capacitance of the touch detection electrode of the touchscreen coupled to the conductive tip, thereby detecting a touch position.

In another aspect, an input pen is configured for use with a display panel having a touchscreen comprising a plurality of touch detection electrodes. The input pen includes a conductive tip coupled to one of the touch detection electrodes when the conductive tip contacts or approaches the display panel; a switching unit connected to the conductive tip; a receiving unit coupled to the switching unit and configured to receive a touchscreen driving signal from the touchscreen through the conductive tip and the switching unit; a driving unit coupled to the switching unit and configured to generate a pen driving signal transferred to touchscreen through the conductive tip and the switching unit, the display panel configured to detect touch or approach of the input pen on the touchscreen in response to the pen driving signal; and a signal processing unit coupled to the receiving unit and driving unit, the signal processing unit configured to calibrate timing of the pen driving signal to synchronize the pen driving signal with the touchscreen driving signal.

In another aspect, an input pen is configured for use with a display panel having a touchscreen comprising a plurality of touch detection electrodes. The input pen includes a conductive tip coupled to one of the touch detection electrodes when the conductive tip contacts or approaches the display panel; a receiving unit configured to receive a touchscreen driving signal from the touchscreen through the conductive tip; a driving unit configured to generate a pen driving signal transferred to the touchscreen through the conductive tip, the display panel configured to detect touch or approach of the input pen on the touchscreen in response to the pen driving signal; and a signal processing unit coupled to the receiving unit and driving unit, the signal processing unit configured to synchronize the pen driving signal with the touchscreen driving signal.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principles of the invention. In the drawings:

FIG. 14 is a waveform diagram illustrating outputs from the constituent elements of a receiving unit in the input pen according to the embodiment described with respect to FIG. 12.

DETAILED DESCRIPTION

Reference will now be made in detail to the various embodiments of an input system and a touch detection method, examples of which are illustrated in the accompanying drawings.

Figure 1:
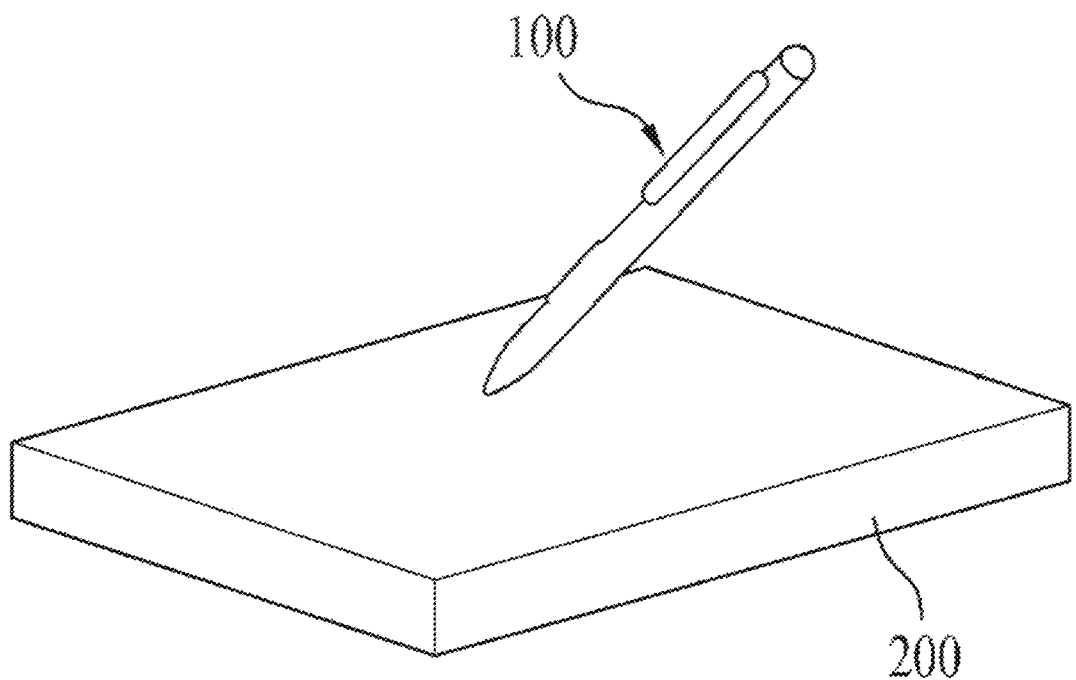
FIG. 1 is a schematic view illustrating an input system according to an embodiment.

FIG. 1 is a schematic view illustrating an input system according to an embodiment.

As illustrated in FIG. 1, the input system includes a display panel 200 having a touch detection function as well as a display function, and an input pen 100. The input system detects touches by the input pen 100 on particular areas of the display panel 200.

The display panel 200 can detect touch by a finger, in addition to touch by the input pen 100. To this end, the display panel 200 includes a capacitive-type touchscreen integrated with the display panel 200. In one embodiment, the touchscreen does not have a structure in which touch electrodes having independent configurations are arranged on a glass substrate. Touch detection electrodes and associated connecting wires in the touchscreen are formed in the same process as a pixel array provided for screen display of the display panel 200, so a support substrate may be eliminated. Accordingly, the display panel 200 may have the almost same thickness and weight as a display panel having only a display function alone.

In some cases, the touchscreen may be at an upper or front surface of the display panel 200 while taking an on-cell type. In this case, the touchscreen may be attached to a back surface of an upper substrate in the display panel 200, and a polarization plate or a protective film may cover upper surfaces of touch detection electrodes constituting the touchscreen.

Meanwhile, the display panel 200 may be a liquid crystal panel, a field emission display panel, a plasma display panel, an organic light emitting diode display panel, an electrophoretic display panel, or the like. The following description associated with various embodiments will be given mainly in conjunction with an example in which the display panel 200 is a liquid crystal panel. However, the display panel 200 is not limited to the liquid crystal panel, and various flat display panels as described above may be applied to the display panel 200.

For example, when the display panel 200 is implemented as a liquid crystal panel, electrodes constituting the touchscreen may be formed simultaneously with wires of the liquid crystal panel a part of a process for forming the wires.

Figure 2:
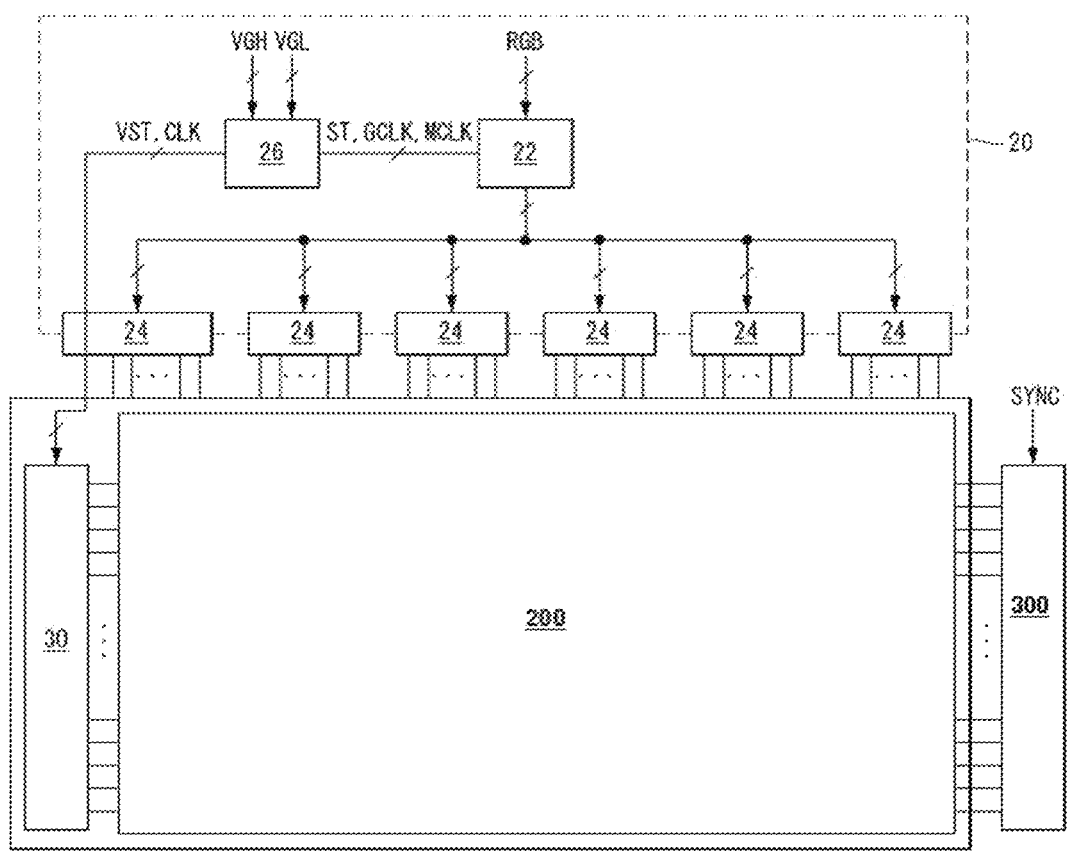
FIG. 2 is a block diagram illustrating a display panel of the input system and a touch controller according to an embodiment.

FIG. 2 is a block diagram illustrating the display panel 200 of the input system and a touch controller according to an embodiment.

As illustrated in FIG. 2, the display panel 200 in the input system is connected to a pixel array driving circuit including a gate driving circuit, data driving circuits 24 and a touch sensing circuit 300 for driving of the touchscreen. All of these elements are connected to a timing controller 22, and may be accommodated in a single module (not shown), together with the timing controller 22.

When the display panel 200 is a liquid crystal panel, the display panel 200 includes a liquid crystal layer formed between two substrates each having a sheet structure. Each substrate may be fabricated using a glass substrate, a plastic substrate, a film substrate, or the like. A pixel array is formed at a lower one of the substrates in the display panel 200. The pixel array includes data lines, gate lines intersecting with the data lines, and pixels arranged in matrix form. The pixel array further includes a plurality of thin film transistors (TFTs) formed at intersections of the data lines and gate lines corresponding to pixels, pixel electrodes to charge the respective pixels with data voltages, and storage capacitors connected to respective electrodes to maintain the pixel voltages.

The pixels of the display panel 200 are formed at pixel regions defined by the data lines, namely, $D_1$ to $D_m$, and the gate lines, namely, $G_1$ to $G_n$, to be arranged in matrix form. A liquid crystal cell of each pixel is driven by an electric field applied thereto according to a voltage difference between a data voltage applied to the corresponding pixel electrode and a common voltage applied to a common electrode in order to adjust transmittance of incident light. Each of the TFTs turns on in response to a gate pulse from a corresponding one of the gate lines $G_1$ to $G_n$ in order to supply a voltage from a corresponding one of the data lines $D_1$ to $D_m$ to the pixel electrode of the corresponding liquid crystal cell. The common electrode may be formed at the lower substrate or the upper substrate.

A black matrix and color filters may be at the upper substrate of the display panel 200. Polarization plates are attached to the upper and lower substrates of the display panel 200, respectively. Orientation films are formed at inner surfaces of the upper and lower substrates contacting liquid crystals to set a pre-tilt angle of the liquid crystals. Spacers are formed between the upper and lower substrates of the display panel 200 to maintain cell gaps of the liquid crystal cells.

The display panel 200 may be implemented with any known liquid crystal mode, for example, a twisted nematic (TN) mode, a vertical alignment (VA) mode, an in-plane switching (IPS) mode, or a fringe field switching (FFS) mode.

Meanwhile, a backlight unit may be selectively arranged at a back surface of the display panel 200. The backlight unit may be implemented with an edge type backlight unit or a direct type backlight unit to emit light to the display panel 200.

The pixel array driving circuit writes input image data to the pixels of the display panel 200, using the data driving circuits 24 and gate driving circuit.

Each data driving circuit 24 converts digital video data RGB input from the timing controller 22 into a positive/negative gamma compensation voltage, thereby generating a data voltage. The data driving circuit 24 supplies the generated data voltage to a corresponding one of the data lines under control of the timing controller 22 and inverts the polarity of the data voltage.

The gate driving circuit sequentially supplies, to the gate lines, gate pulses (or scan pulses) synchronized with data voltages and thereby selects lines of the display panel 200 to which the data voltages are written. The gate driving circuit includes a level shifter 26 and a shift register 30. The shift register 30 may be directly formed at one substrate of the display panel 200 through a gate-in panel (GIP) process.

The level shifter 26 may be formed at a printed circuit board (PCB) 20 electrically connected to the lower substrate of the display panel 200. The level shifter 26 outputs clock signals swinging between a gate-high voltage VGH and a gate-low voltage VGL under control of the timing controller 22. The gate-high voltage VGH is set to a voltage greater than or equal to a threshold voltage of the TFTs formed at the pixel array of the display panel 200. The gate-low voltage VGL is set to a voltage less than the threshold voltage of the TFTs formed at the pixel array of the display panel 200. In response to a start pulse ST, a first clock GCLK, and a second clock MCLK input from the timing controller 22, the level shifter 26 outputs a start pulse VST and clock signals CLK, which swing between the gate-high voltage VGH and the gate-low voltage VGL. The clock signals CLK output from the level shifter 26 are transferred to the shift register 30 formed at the display panel 200 after sequentially shifting in phase.

The shift register 30 is formed at an edge portion of the lower substrate in the display panel 200 where the pixel array is formed for connection to the gate lines of the pixel array. The shift register 30 includes a plurality of stages connected in a dependent manner.

The shift register 30 operates in response to the start pulse VST input from the level shifter 26 and performs output shift in response to the clock signals CLK, thereby sequentially supplying gate pulses to respective gate lines of the display panel 200.

The timing controller 22 supplies digital video data RGB input from an external host system to integrated circuits (ICs) of the data driving circuits 24. The timing controller 22 receives timing signals input from the external host system such as a vertical synchronization signal Vsync, a horizontal synchronization signal Hsync, a data enable signal DE and clocks. The timing controller 22 generates timing control signals for controlling operation timing of the data driving circuits 24 and gate driving circuit. The timing controller 22 or host system generates synchronization signal SYNC for controlling operation timing of the pixel array driving circuit and touch sensing circuit 300.

The touch sensing circuit 300 applies a driving signal to the lines of the touchscreen and senses a variation in capacitance of the touchscreen by counting a variation in voltage of the driving signal before and after touch or a rising or falling edge delay time of the driving signal. The touch sensing circuit 300 converts sensing data received from a capacitor of the touchscreen into digital data, thereby outputting raw touch data. The touch sensing circuit 300 then executes a predetermined touch recognition algorithm to detect touch (or approach or proximity) input through analysis of the raw touch data. Touch refers to direct contact between the input pen 100 (or a finger or other input tool) and the display panel 200. Proximity (or approach) refers to presence of the input pen 100 (or a finger or other input tool) within a threshold distance of the display panel 200 without directly contacting the display panel 200.

Figure 3:
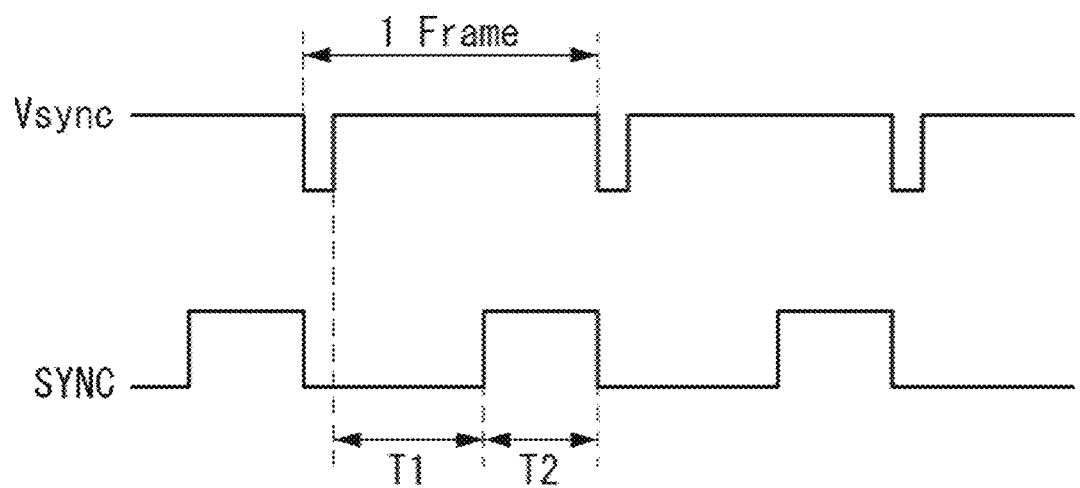
FIG. 3 is a waveform diagram illustrating time-division driving of the display panel in the input system according to an embodiment.

FIG. 3 is a waveform diagram illustrating time-division driving of the display panel in the input system according to an embodiment.

As illustrated in FIG. 3, the display panel 200 and touchscreen may be driven in a time division manner. That is, one frame may be time-divided into a pixel array driving period T1 and a touchscreen driving period T2.

"Vsync" represents a first vertical synchronization signal input to the timing controller 22, and "SYNC" represents a second vertical synchronization signal input to the touch sensing circuit 300. In order to define the pixel array driving period T1 and touchscreen driving period T2 in one frame period, the timing controller 22 may generate the second vertical synchronization signal SYNC through modulation of the first vertical synchronization signal Vsync input from the host system. Alternatively, the host system may generate the second vertical synchronization signal SYNC, so the timing controller 22 may control the pixel array driving period T1 and touchscreen driving period T2 in response to the second vertical synchronization signal SYNC input from the host system. That is, the controller, which controls operation timing of the pixel array driving circuit and touch sensing circuit through time division of one frame period into a pixel array driving period and a touchscreen driving period, may be one of the timing controller 22 and host system.

For example, when it is assumed that the display panel 200 is driven at a frequency of 60 Hz, and the above-described time division is applied, one frame period is ⅟60 seconds. One frame period may be divided into the pixel array driving period T1 and touchscreen driving period T2. When one frame period is divided into the pixel array driving period T1 and touchscreen driving period T2 through time division, it may be possible to prevent non-uniformity of a display screen and inaccurate touch detection caused by driving interference between the pixel array and the touchscreen occurring when the pixel array and touchscreen are driven at the same time.

During the pixel array driving period T1, the data driving circuits 24 supply data voltages to the corresponding data lines under control of the timing controller 22, and the gate driving circuit sequentially supplies gate pulses synchronized with the data voltages to the corresponding gate lines. The touch sensing circuit 300 does not supply a driving signal to the lines of the touchscreen during the pixel array driving period T1.

Meanwhile, during the touchscreen driving period T2, the pixel array driving circuit does not operate as it does during the pixel array driving period T1, but the touch sensing circuit 300 operates. Accordingly, the touch sensing circuit 300 supplies a driving signal to the lines of the touchscreen during the touchscreen driving period T2 and senses a touch (or approach or proximity) input position.

Hereinafter, the line structure of the touchscreen will be described in detail.

The following description will be given in conjunction with an example in which the touchscreen used in the input system has an in-cell type structure and implements capacitive detection.

Figure 4A:
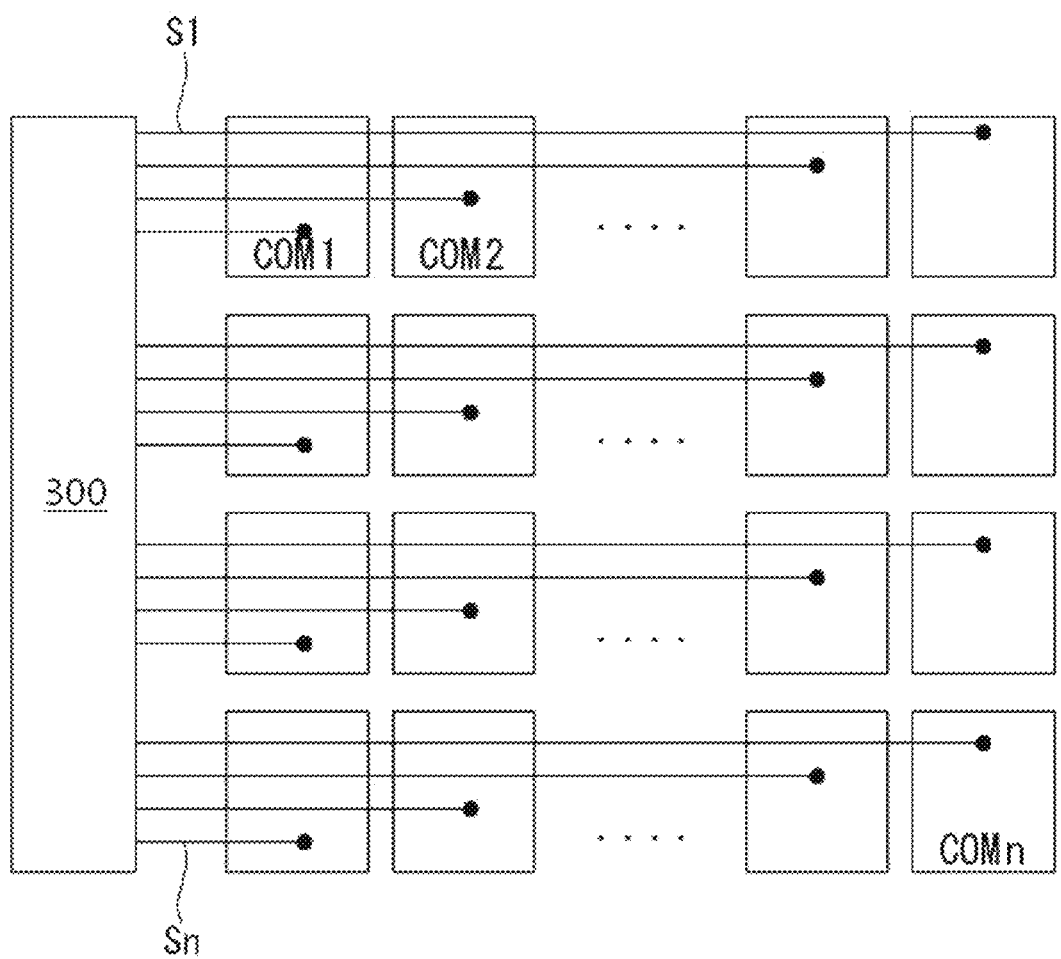
FIGS. 4A and 4B are block diagrams illustrating a touchscreen in the input system and a touch controller according to an embodiment.
Figure 4B:
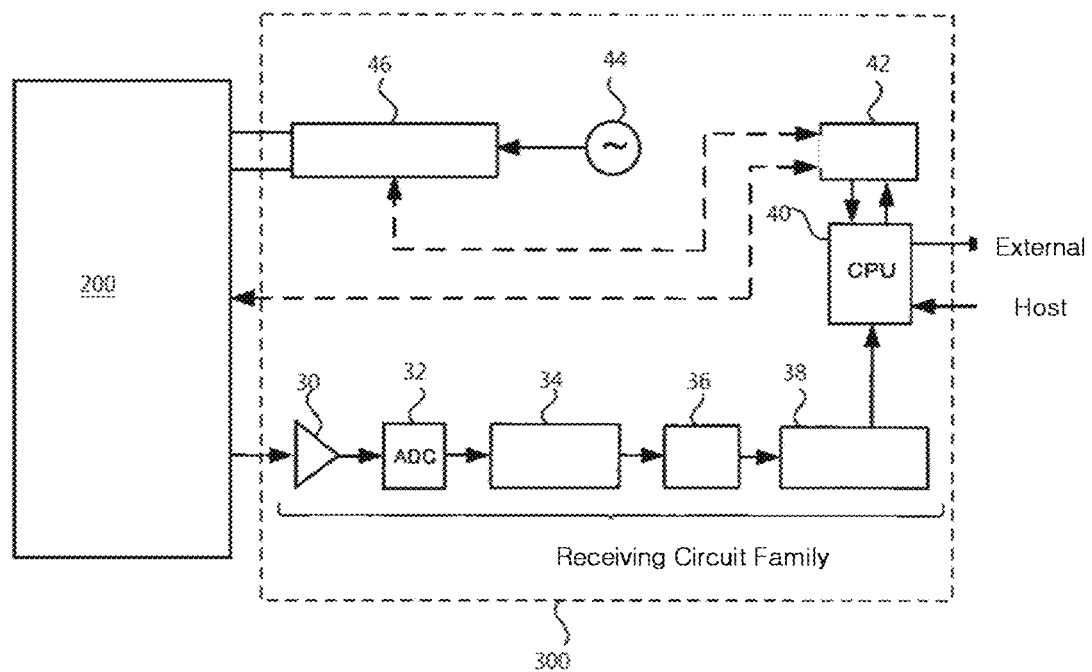

FIGS. 4A and 4B are block diagrams illustrating the touchscreen in the input system and a touch controller according to an embodiment.

The touchscreen having a structure of FIG. 4A includes touch detection electrodes $COM_1$, $COM_2$, . . . , and $COM_n$ included inside of the display panel 200 to detect the position of an input tool.

For example, the display panel 200 is a liquid crystal panel that includes a lower substrate, an upper substrate, a pixel array at (i.e., in or on) the lower substrate and a color filter array at the upper substrate. In this example, the touch detection electrodes may be formed at the lower substrate together with the pixel array or may be formed over the color filter array. If necessary, the touch detection electrodes may be formed through patterning of common electrodes formed at the lower substrate or upper substrate. When the touch detection electrodes $COM_1$, $COM_2$, . . . , and $COM_n$ are formed through patterning of common electrodes, a common voltage signal is uniformly applied to the touch detection electrodes $COM_1$, $COM_2$, . . . , and $COM_n$ during pixel array driving because the touch detection electrodes $COM_1$, $COM_2$, . . . , and $COM_n$ function as common electrodes.

The touch detection electrodes $COM_1$, $COM_2$, . . . , and $COM_n$ are connected to sensing lines $S_1$ to $S_n$, respectively. The sensing lines $S_1$ to $S_n$ are connected to the touch sensing circuit 300.

As illustrated in FIG. 4B, the touch sensing circuit 300 includes a receiving circuit family including a receiving amplifier 30, an analog-to-digital conversion circuit 32, a wave detector 34, a memory 36, and a position calculator 38.

The receiving circuit family is connected to a central processing unit (CPU) 40 connected to an external host. The CPU 40 is connected to a controller 42 to control touch. The controller 42 is connected to a driving signal generator 46, a touchscreen driving signal Ts generated from an oscillator 44 is supplied to the touch detection electrodes $COM_1$, $COM_2$, . . . , and $COM_n$ via the sensing lines $S_1$ to $S_n$, respectively.

As the touch sensing circuit 300 includes the receiving circuit family and touch driving circuit 46 in this case, it may be possible to achieve touch detection even when a non-powered driving type input means such as a finger approaches or touches the touchscreen.

The illustrated touchscreen is of a self-capacitance type, so the touch detection electrodes $COM_1$, $COM_2$, . . . , and $COM_n$ are used for application of a driving signal and detection of a received signal.

The size of each of the touch detection electrodes $COM_1$, $COM_2$, . . . , and $COM_n$ is greater than that of the pixels. For example, each of the touch detection electrodes $COM_1$, $COM_2$, . . . , and $COM_n$ has a size overlapping a plurality of pixels. The touch detection electrodes $COM_1$, $COM_2$, . . . , and $COM_n$ are made of a transparent conductive material to prevent a reduction in aspect ratio in a display period when the pixel array is driven.

Meanwhile, a common voltage source not illustrated supplies a common voltage Vcom to the touch detection electrodes $COM_1$, $COM_2$, . . . , and $COM_n$ via the sensing lines $S_1$ to $S_n$, respectively, during the pixel array driving period T1. Accordingly, the touch detection electrodes $COM_1$, $COM_2$, . . . , and $COM_n$ operate as common electrodes during the pixel array driving period T1. Although not shown, a selection circuit to select a desired one of the touch detection electrodes $COM_1$, $COM_2$, . . . , and $COM_n$ is connected to the touch sensing circuit 300.

The touch sensing circuit 300 is disabled during the pixel array driving period T1 and is enabled during the touchscreen driving period T2 to simultaneously supply a touchscreen driving signal to the sensing lines $S_1$ to $S_n$.

Figure 5:
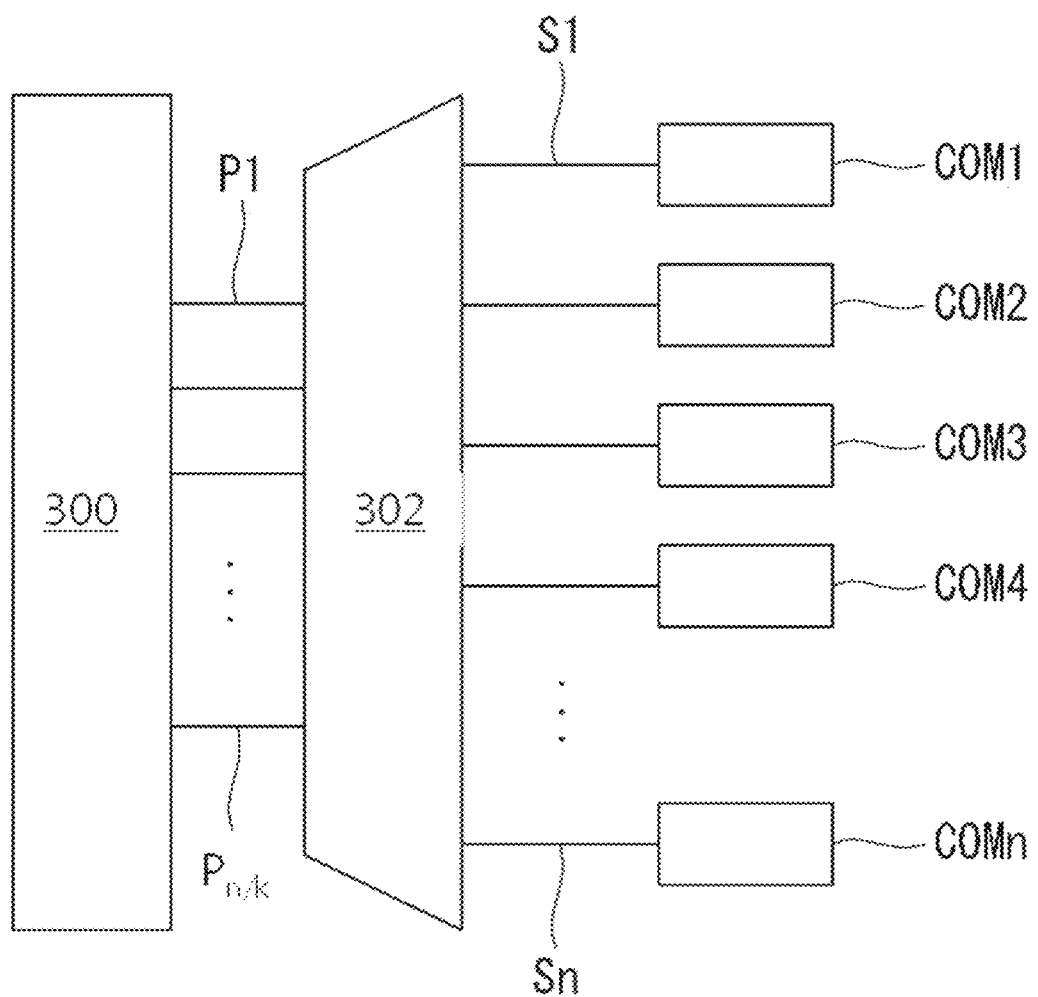
FIG. 5 is an example block diagram illustrating a touchscreen and a touch controller according to an embodiment.
Figure 6:
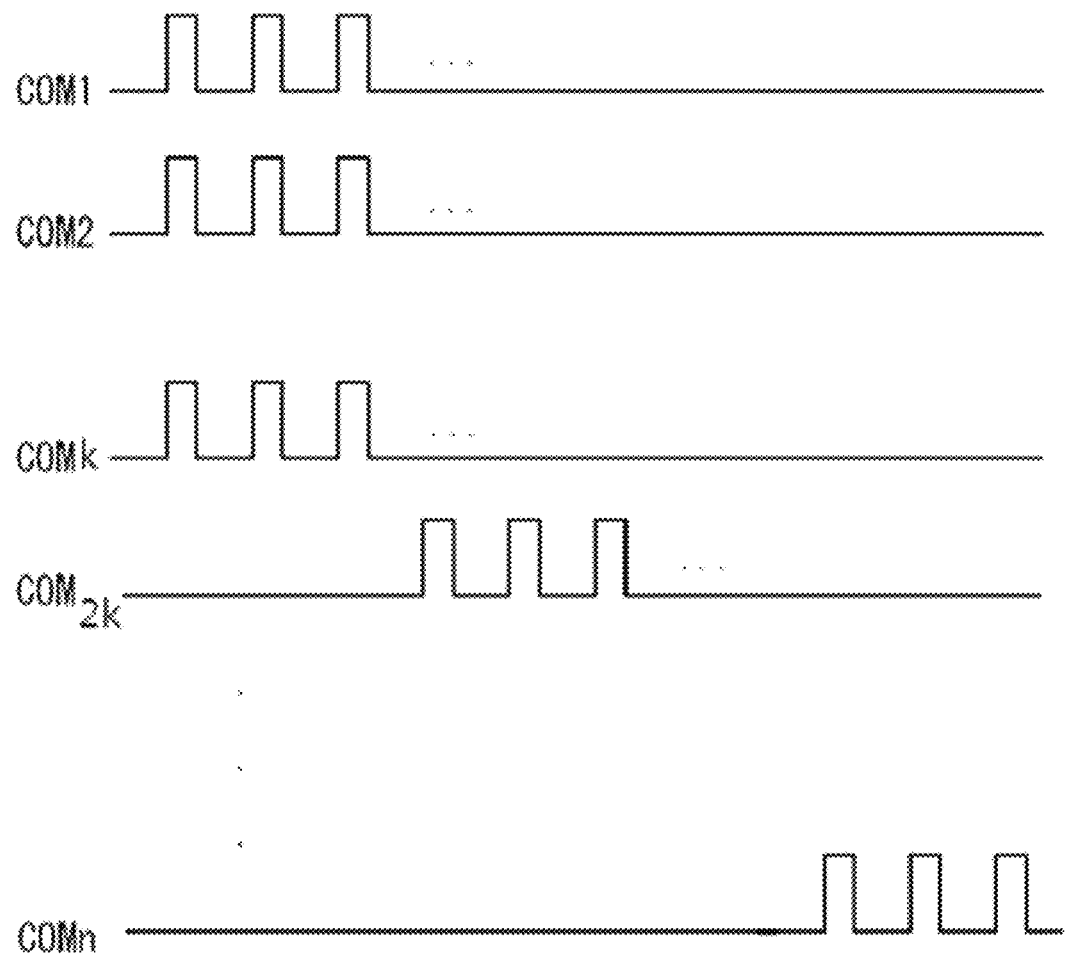
FIG. 6 is a waveform diagram illustrating driving signals supplied to touch detection electrodes of a touchscreen according to an embodiment.

FIG. 5 is an example block diagram illustrating a touchscreen and a touch controller according to an embodiment. FIG. 6 is a waveform diagram illustrating driving signals supplied to the touch detection electrodes of a touchscreen according to an embodiment.

In a self-capacitance type touchscreen TSP, as illustrated in FIG. 5, a multiplexer 302 is connected to signal input ends of the touch detection electrodes $COM_1$, $COM_2$, . . . , and $COM_n$ in order to reduce the number of lines extending from the touch sensing circuit 300 to apply signals. In this case, signals may be applied to the sensing lines $S_1$ to $S_n$ in a time division manner. A single multiplexer 302 or a plurality of multiplexers 302 may be included. For example, when the multiplexer 302 is a 1:k multiplexer (k being a natural number not less than 2, but less than n), the multiplexer 302 is connected to the touch sensing circuit 300 via n/k input/output pins $P_1$ to $P_{n/k}$. In this case, as illustrated in FIG. 6, the n touch detection electrodes $COM_1$, $COM_2$, . . . , and $COM_n$ are grouped into k groups, so k touch detection electrodes in each group receive a corresponding one of touchscreen driving signals Ts obtained in a time division manner. That is, a touchscreen driving signal Ts having a predetermined phase is applied to touch detection electrodes $COM_1$ to $COM_k$ of the first group, and a touchscreen driving signal Ts shifted from that of the first group by a predetermined time width is applied to touch detection electrodes $COM_{k+1}$ to $COM_{2k}$ of the second group. In such a manner, n/k shifted touchscreen driving signals Ts are applied to the touch detection electrodes $COM_1$ to $COM_n$ of the first to k-th groups up to the n/k final touch detection electrodes $COM_{k(m-1)+1}$ to $COM_n$, where k×m=n.

Meanwhile, although the detection type of the touchscreen in the above-described input system is a self-capacitance type, the detection type is not limited thereto. If necessary, the touchscreen may be applied to a mutual-capacitance type in which touch detection is achieved through detection of a capacitance variation between crossing electrodes. In the mutual-capacitance type touchscreen, driving signal application electrodes and detection signal application electrodes are arranged to cross each other. The electrodes of the touchscreen may be arranged at the inside of the display panel, together with the pixel array. Alternatively, the electrodes of the touchscreen may be outside of the display panel. That is, the touchscreen structure in the input system may be applied to both the in-cell type and the on-cell type. When the touchscreen is of a capacitive type it may be a self-capacitance type a mutual-capacitance type, or any other capacitive type.

Hereinafter, the structure and operation of the input pen synchronized with the touchscreen will be described in detail.

Figure 7:
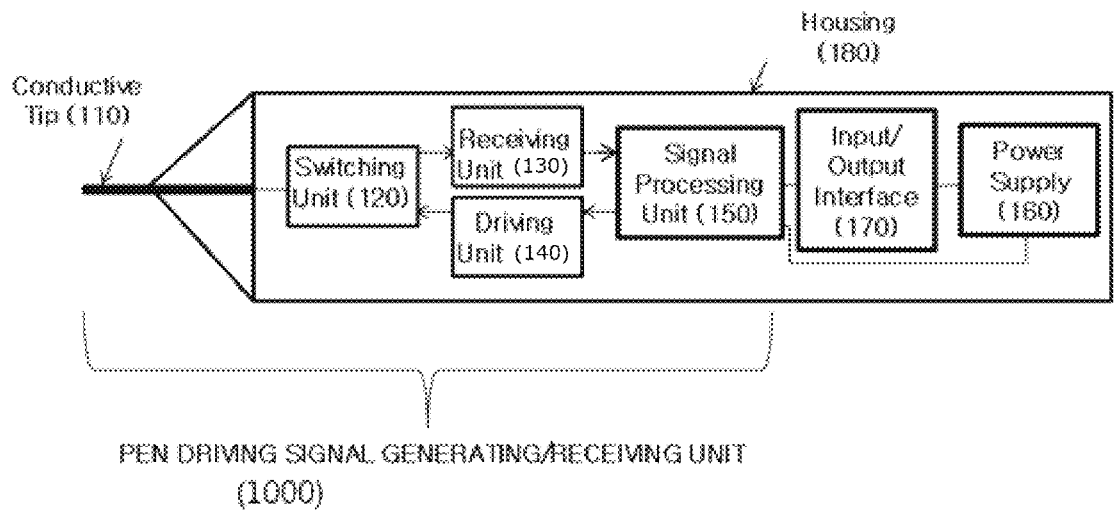
FIG. 7 is a block diagram illustrating an inner structure of the input pen according to an embodiment.

FIG. 7 is a block diagram illustrating an inner structure of the input pen 100 according to an embodiment.

As illustrated in FIG. 7, the input pen 100 used as an input tool includes a housing 180, a conductive tip 110 protruding outwards from one side of the housing 180, a switching unit 120 connected to the conductive tip 110 at the inside of the housing 180, a receiving unit 130 and a driving unit 140, which are connected to the switching unit 120 in parallel, a signal processing unit 150 for receiving a receiving signal from the receiving unit 130 and for executing synchronization of the receiving signal through signal processing, a power supply 160 for supplying power, and an input/output interface 170 to the outside of the input pen. The conductive tip 110, switching unit 120, receiving unit 130, driving unit 140, and signal processing unit 150 may be referred to collectively as the pen driving signal generating/receiving unit 1000. Further features of the pen driving signal generating/receiving unit 1000 are described with respect to FIG. 12.

The conductive tip 110 is made of a conductive material such as metal. The conductive tip 110 functions as a receiving electrode and a transmitting electrode in a time division manner. When the conductive tip 110 contacts or approaches the display panel 200, the conductive tip 110 is coupled to a selected one of the touch detection electrodes included in the touchscreen, namely, a touch detection electrode $COM_x$, which overlaps the conductive tip 110 or is positioned most closely to the conductive tip 110, so the conductive tip 110 receives a signal from the touch detection electrode $COM_x$ or transfers a driving signal output from the inside of the input pen 100 to the touchscreen.

For example, a polarization plate or a protective film is disposed at an uppermost side of the display panel 200 and is positioned between the touch detection electrodes and the conductive tip 110. Accordingly, the polarization plate or protective film functions as an insulating layer, and a sensing capacitor $C_{sen}$ is formed between the conductive tip 110 and the touch detection electrodes. When the conductive tip 110 contacts or approaches the display panel 200, the capacitance of the sensing capacitor $C_{sen}$ is varied at the touch detection electrode disposed in a region where the conductive tip 110 contacts or approaches the display panel 200. The touch sensing circuit detects the touch position by reading the capacitance variation. When the conductive tip 110 contacts the display panel 200, the driving signal applied to the touch detection electrode may be detected. Alternatively or additionally, detection of a driving signal may be possible when the conductive tip 110 approaches the display panel 200 within a predetermined distance. This means that synchronization is achieved between driving of the input pen 100 and driving of the touch panel even when the input pen 100 hovers over the display panel 200 without contacting an upper surface of the display panel 200, and touch recognition is achieved through such synchronization.

Meanwhile, when the input pen 100 contacts the display panel 200, the switching unit 120 is directly electrically connected to the conductive tip 110 to determine whether the conductive tip 110 functions as a receiving electrode or a transmitting electrode.

Since the amplitude of the signal received from the conductive tip 110 is weak, the receiving unit 130 includes an amplifier to amplify the received signal. Here, the signal received by the conductive tip 110 corresponds to the touchscreen driving signal Ts applied to the touch detection electrode corresponding to the contact region.

When the input pen 100 contacts or approaches the display panel 200 after turning on in an initial state, the conductive tip 110 is directly connected to the receiving unit 130 via the switching unit 120. In this state, the receiving unit 130 amplifies a touchscreen driving signal Ts received from the display panel 200 by the amplifier included in the receiving unit 130 and, the signal processing unit 150 uses the amplified signal.

The signal processing unit 150 analyzes one frame or more of the amplified signal received through the receiving unit 130 and generates a timing signal synchronized with the touchscreen driving signal Ts. The timing signal is then transferred to the driving unit 140.

The driving unit 140 includes a level shifter, to generate an input pen driving signal Ps synchronized with timing of the touchscreen driving signal Ts while swinging between a predetermined high-level voltage and a predetermined low-level voltage. The driving unit 140 transfers the input pen driving signal Ps to the conductive tip 110 via the switching unit 120.

Meanwhile, the power supply 160 and input/output interface 170 are included inside of the housing 180 to enable control of on-driving of the input pen 100 at the outside of the input pen 100 via the input/output interface 170. The input/output interface 170 is connected to the power supply 160 at the inside of the housing 180 to supply power required for the receiving unit 130, driving unit 140, and signal processing unit 150.

In this case, the input/output interface 170 is electrically connectable to the power supply 160 in accordance with a pushing operation by a user on a physical affordance (e.g., a button, a switch) in order to control operation of the input pen 100, particularly operation of the power supply 160. Alternatively or additionally, the input/output interface 170 is configured to receive electrical commands from the display panel 200 or another device to control the power supply 160. Controlling the power supply 160 includes turning the power supply 160 and input pen 100 on or off.

Figure 8:
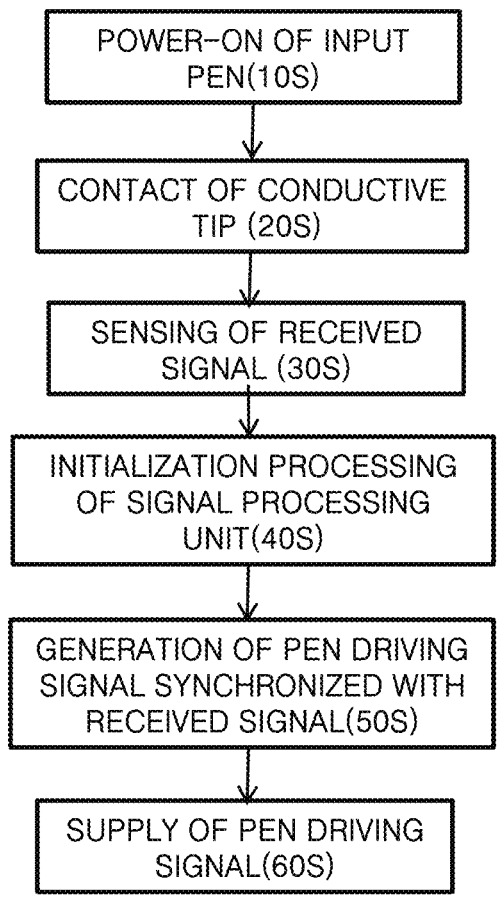
FIG. 8 is a flowchart illustrating operation of the input pen according to the embodiment described with respect to FIG. 7.

FIG. 8 is a flowchart illustrating operation of the input pen according to the embodiment described with respect to FIG. 7.

First, power is supplied to the input pen 100 via the input/output interface 170 and power supply 160 (10S).

Thereafter, the conductive tip 110 contacts a selected region of the display panel 200 (20S).

At a time when the conductive tip 110 initially contacts the display panel 200, the conductive tip 110 is coupled to a selected one of the touch detection electrodes in the display panel 200 and senses a touchscreen driving signal received from the selected touch detection electrode and then transfers the resultant sensing signal to the receiving unit 130 (30S).

The receiving unit 130 amplifies the received signal using the amplifier included therein, and transfers the amplified signal to the signal processing unit 150 which seeks timing synchronized with the signal output from the touch detection electrode (40S). The signal processing unit 150 may compare the amplified signal received from the receiving unit 130 with a predetermined threshold value, using a comparator included therein, to determine whether or not the amplified signal is higher than the threshold value, and then may output a digital pen sensing signal corresponding to the determined results.

Meanwhile, the signal processing unit 150 analyzes the signal received from the receiving unit 130, to seek synchronization timing between the received signal and the pen driving signal Ps generated from the input pen 100. This process is executed during a period of, for example, one frame or more.

When such signal calibration is executed for one frame or more, it may be possible to sufficiently calibrate a phase difference between the received touchscreen driving signal Ts and the pen driving signal Ps.

Practically, the whole of one frame is not used for touch, and one frame is divided into the pixel array driving period T1 and the touchscreen driving period T2, so the touchscreen driving signal from the touchscreen will be received only in the touchscreen driving period T2. The signal calibration of the signal processing unit 150 is executed after a sufficient touchscreen driving signal is received from the touchscreen within a period of one frame or more, to determine synchronization timing of the touchscreen driving signal.

When a phase error between the touchscreen driving signal Ts and the pen driving signal Ps is greater than a default value, a separate calibration algorithm may be further executed.

Thereafter, the driving unit 140 generates a driving signal swinging between a predetermined high-level voltage and a predetermined low-level voltage in accordance with timing information output from the signal processing unit 150 (50S).

Subsequently, in accordance with the driving signal, the conductive tip 110 is switched to a drive electrode by the switching unit 120, so the pen driving signal Ps is supplied to the touchscreen via the conductive tip 110 (60S).

After the initial on-operation of the input pen 100, a switching period is present between a receiving period Rx that the touchscreen driving signal Ts is received from the touchscreen and a transmitting period Tx that the pen driving signal Ps transmits to the touchscreen. This switching period is used for signal calibration of the signal processing unit 150.

In subsequent frames, a process Tx for transferring the pen driving signal Ps synchronized with the touchscreen driving signal Ts via the conductive tip 110 and a process Rx for receiving the touchscreen driving signal Ts by the conductive tip 110 are repetitively executed in a time division manner. Once the pen driving signal Ps is initially synchronized with the touchscreen driving signal Ts, the switching period between the receiving period Rx and the transmitting period Tx for pen driving may be eliminated from subsequent frames. In this case, pen driving may be executed in a touch sensing period under the condition that the touch sensing period is time-divided into a receiving period and a transmitting period.

Meanwhile, after transfer of the pen driving signal to the touchscreen, the touchscreen is connected to the touch sensing circuit 300 which, in turn, senses a variation in capacitance between the conductive tip 110 and the touch detection electrode $COM_n$ of the touchscreen coupled to the conductive tip 110. The touch sensing circuit 300 then detects a touch position through execution of a touch sensing algorithm.

Figure 9:
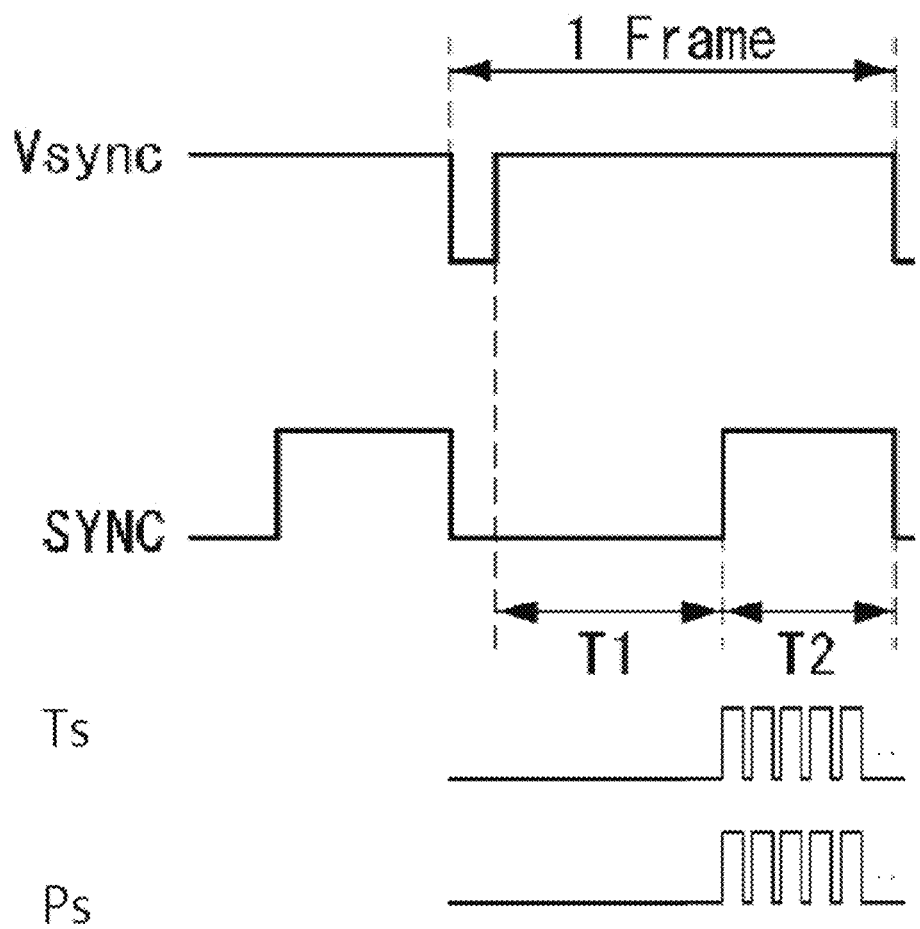
FIG. 9 is a waveform diagram illustrating relation between a touchscreen driving signal and a pen driving signal according to the embodiment described with respect to FIG. 7.
Figure 10:
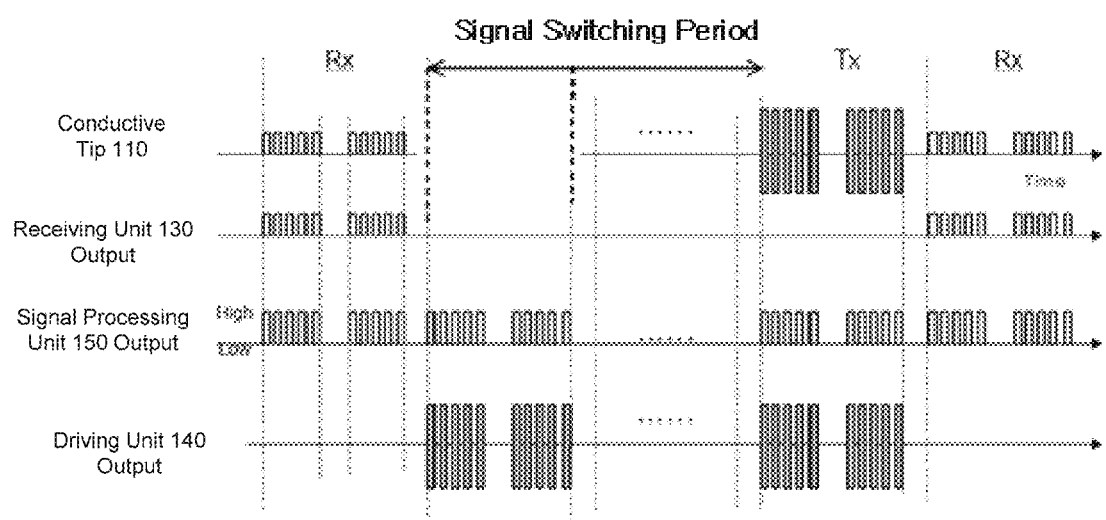
FIG. 10 is a waveform diagram of signals associated with respective constituent elements of the input pen according to the embodiment described with respect to FIG. 7.

FIG. 9 is a waveform diagram illustrating relation between the touchscreen driving signal and the pen driving signal according to the embodiment described with respect to FIG. 7. FIG. 10 is a waveform diagram of signals associated with respective constituent elements of the input pen 100 according to the embodiment described with respect to FIG. 7.

As illustrated in FIG. 10, the conductive tip 110 of the input pen 100 functions as a receiving electrode in accordance with an initial on-operation of the power supply, so the conductive tip receives a signal from a touch detection electrode during the receiving period Rx. After a predetermined switching period, the conductive tip 110 receives a pen driving signal from the transmitting unit and switches to a transmitting electrode to transmit the pen driving signal Ps during transmitting period Tx.

In this case, the receiving unit 130 of the input pen 100 directly detects the waveform of the signal received by the conductive tip 110 (i.e., the touchscreen driving signal), and then generates a receiving signal having a predetermined amplitude through the amplifier for desired processing.

The signal processing unit 150 generates timing synchronized with the receiving signal, based on the signal received by the receiving unit 130 (i.e., touchscreen driving signal Ts).

The driving unit 140 generates a pen driving signal swinging between the predetermined low-level voltage and the predetermined high-level voltage while being synchronized with timing of the signal analyzed in the signal processing unit 150.

After synchronization of a pen driving signal Ps with a touchscreen driving signal Ts, subsequent pen driving signals Ps are generated only in periods that touchscreen driving signals Ts are generated, among respective touchscreen driving periods T2 of subsequent frames, as illustrated in FIG. 9.

Although the time widths of the transmitting period Tx and receiving period Rx are illustrated as being equal in the case of FIG. 10, it is preferred that the time width of the receiving period Rx be as short as possible because the time width of the receiving period Rx decreases the touch response rate. Accordingly, the transmitting period Tx has a relatively long time width.

Figure 11:
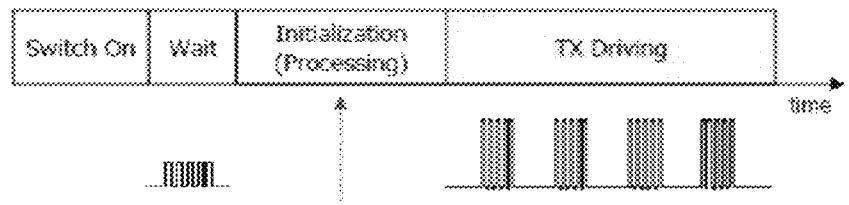
FIG. 11 is a diagram illustrating operations of a conductive tip of the input pen that are executed at different times according to the embodiment described with respect to FIG. 7.

FIG. 11 is a diagram illustrating operations of the conductive tip 110 of the input pen 100 that are executed at different times, according to the embodiment described with respect to FIG. 7.

As illustrated in FIG. 11, when the conductive tip 110 contacts the display panel 200 having the touchscreen under the condition that the input pen 100 is switched on, the conductive tip 110 waits for a predetermined time to receive a signal under the condition that no pen driving signal is generated at the inside of the input pen 100. The conductive tip 110 only performs signal reception during the wait time. Here, the received signal corresponds to a touchscreen driving signal Ts.

After completion of signal reception, an initialization for generation of a pen driving signal Ps is executed for a predetermined time. This initialization period may be a switching period during which the conductive tip 110 switches from a receiving electrode to a transmitting electrode. The initialization period may be one frame or more. During this period, the signal processing unit included in the input pen 100 analyzes the received signal and generates a pen driving signal Ps synchronized with the received signal.

Accordingly, during operation of the touchscreen to detect whether or not touch occurs, a variation in capacitance occurs at the touch detection electrode corresponding to a region where the input pen 100 contacts or approaches the touchscreen, in accordance with application of the touchscreen driving signal Ts. In this case, the capacitance variation caused by contact or approach of the input pen 100 occurs in sync with a corresponding sensing time, so it may be possible to accurately detect a touch position.

The following embodiment is associated with a concrete configuration of a pen driving signal generating/receiving unit 1000 in the input pen 100 of FIG. 7. The following description provides concrete configurations for generating a pen driving signal and performing a sensing operation.

Figure 12:
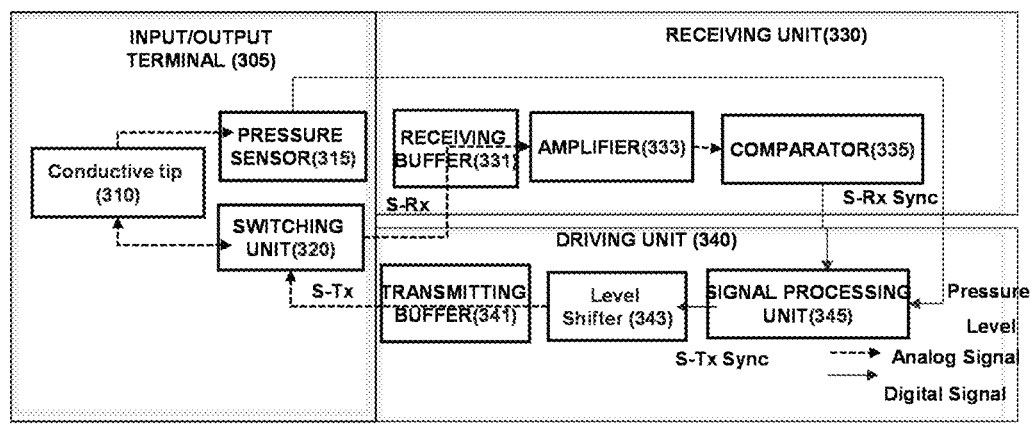
FIG. 12 is a block diagram illustrating an inner structure of the input pen according to an embodiment.

FIG. 12 is a block diagram illustrating an inner structure of the input pen 100 according to an embodiment.

FIG. 12 illustrates a configuration of the pen driving signal generating/receiving unit 1000 included in the input pen 100 of FIG. 7. The pen driving signal generating/receiving unit 1000 may be accommodated in the housing 180. It will be appreciated that the input pen 100 may further include the power supply 160, which is connected to a signal processing unit 345 while being accommodated in the housing 180, to supply power, and the input/output interface 170 to an outside of the input pen 100, which is accommodated in the housing 180.

As illustrated in FIG. 12, the pen driving signal generating/receiving unit 1000 mainly includes an input/output terminal 305 for receiving a signal through the conductive tip 310 of the input pen 100 while directly contacting the touchscreen or hovering over the touchscreen and transferring a pen driving signal generated at the inside of the input pen. The pen driving signal generating/receiving unit further includes a receiving unit 330 for processing a pen sensing signal S_Rx and a driving unit 340 for generation of a pen driving signal S_Tx.

Here, used as the pen sensing signal S_Rx is a driving signal generated from the touchscreen when the input pen 100 is coupled to a touch electrode of the touchscreen contacting or positioned in proximity to the input pen. The driving signal is used for pen sensing through amplification of an analog signal received by the receiving unit 330 and conversion of the amplified analog signal into a digital signal. That is, no separate pen sensing signal is generated at the inside of the input pen, and a signal received from the touchscreen when the input pen is coupled to the touchscreen is used for pen sensing.

The input/output terminal 305 includes a physical conductive tip 310, a switching unit 320, and a pressure sensor 315. The switching unit 320 and pressure sensor 315 are connected to the conductive tip 310. The pressure sensor 315 is optional. When the pressure sensor 315 is included, a pen driving signal S_Tx can advantageously be generated in accordance with a detected pressure level to enhance the sensitivity of the input pen to touch events.

The switching unit 320 and pressure sensor 315 are connected to the conductive tip 310 through electrical connection and physical connection, respectively.

The receiving unit 330 includes a receiving buffer 331, an amplifier 333, and a comparator 335. The comparator 335 is connected to the signal processing unit 345. Although the signal processing unit 345 is illustrated in FIG. 12 as being included in the driving unit 340, the signal processing unit 345 executes signal processing in association with synchronization of a touchscreen driving signal of the touchscreen and generation of a pen driving signal S_Tx at the inside of the signal processing unit 345 in order to control both the receiving unit 330 and the driving unit 340 while controlling transfer of an on-signal to the switching unit 320.

The receiving buffer 331 receives a signal from the touchscreen via the conductive tip 310 in accordance with function selection of the receiving unit 330 by the switching unit 320, and transfers the received signal to the amplifier 333. If necessary, the receiving buffer 331 may be eliminated, and the switching unit 320 may be directly connected to the amplifier 333.

The amplifier 333 includes a plurality of stages to increase the amplitude of the received sensing signal in order to enhance sensitivity.

The comparator 335 compares the sensing signal output from the amplifier 333 with a threshold value, and outputs a digital pen sensing signal based on a threshold value. For example, the comparator 335 outputs a high digital value (e.g., a non-zero digital value) when the amplifier output is greater than or equal to the threshold value, and the comparator 335 outputs a low digital value (e.g., zero, a positive digital value less than the high digital value) when the amplifier output is less than the threshold value.

The driving unit 340 includes a signal processing unit 345 for receiving the digital pen sensing signal output from the comparator 335, thereby generating a pen driving signal S_Tx, a level shifter 343 for converting the digital pen driving signal output from the signal processing unit 345 into an analog pen driving signal, and a transmitting buffer 341 for transferring the signal output from the level shifter 343 to the switching unit 320. In this case, the transmitting buffer 341 may be eliminated, and the level shifter 343 may be directly connected to the switching unit 320.

The switching unit 320 is connected to the receiving buffer 331 of the receiving unit 330 and the transmitting buffer 341 of the transmitting unit 340 in order to transfer the sensing signal from the conductive tip 310 to the receiving buffer 331 or in order to transfer the pen driving signal S_Tx from the transmitting buffer 341 to the conductive tip 310 in accordance with selection of the switching unit 320. The switching unit 320 operates under control of the signal processing unit 345 in association with signal reception and transmission.

The signal output from the comparator 335 is a pen sensing signal S_Rx, which is a digital signal converted from a signal having a level higher than the threshold value or not higher than the threshold value among analog signals amplified by the amplifier. In this case, whether the pen sensing signal S_Rx is high in response to a value greater than or less than the threshold value depends on whether the amplifier is an inverting amplifier. For example, when the amplifier is an inverting amplifier, an amplifier output less than the threshold value results in a pen sensing signal S_Rx indicating that touch is detected. When the amplifier is a non-inverting amplifier, an amplifier output greater than (or equal to) the threshold value results in a pen sensing signal S_Rx indicating that touch is detected or alternatively results in no pen sensing signal S_Rx being outputted.

The pen sensing signal S_Rx and pen driving signal S_Tx input and output through the signal processing unit 345 have digital levels, respectively. The output pen driving signal S_Tx, which has a digital level, is converted into an analog signal by the level shifter 343.

Meanwhile, the conductive tip 310 of the input pen is made of a conductive material such as metal. The conductive tip 310 functions as a receiving electrode and a transmitting electrode in a time division manner. When the conductive tip 310 contacts or approaches (i.e., is positioned in proximity to) the display panel 200, the conductive tip 310 is coupled to a selected one of the touch detection electrodes included in the touchscreen, namely, a touch detection electrode $COM_x$, which overlaps the conductive tip 310 or is positioned closely to the conductive tip 310, so the conductive tip 310 receives a signal from the touch detection electrode $COM_x$ or transfers a driving signal output from the inside of the input pen to the touchscreen.

For example, a polarization plate or a protective film is disposed at an uppermost side of the display panel ("200" in FIG. 1) and is positioned between the touch detection electrodes and the conductive tip 310. Accordingly, the polarization plate or protective film functions as an insulating layer, so a sensing capacitor $C_{sen}$ is formed between the conductive tip 310 and the touch detection electrodes. When the conductive tip 310 contacts or approaches the display panel 200, the capacitance of the sensing capacitor $C_{sen}$ is varied at the touch detection electrode disposed in a region where the conductive tip 310 contacts or approaches the display panel 200. As the touch sensing circuit reads the capacitance variation, detection of the touch position may be achieved. When the conductive tip 310 contacts the display panel 200, the driving signal applied to the touch detection electrode may be more easily detected. Alternatively or additionally, detection of a driving signal may be possible when the conductive tip 310 approaches the display panel 200 within a predetermined distance. This means that synchronization is achieved between driving of the input pen 100 and driving of the touch panel even when the input pen 100 hovers in proximity to the display panel 200 without contacting an upper surface of the display panel 200, and touch recognition is achieved through the synchronization.

Hereinafter, a touch detection method according to the embodiment described with respect to FIG. 12 will be described in detail.

Figure 13:
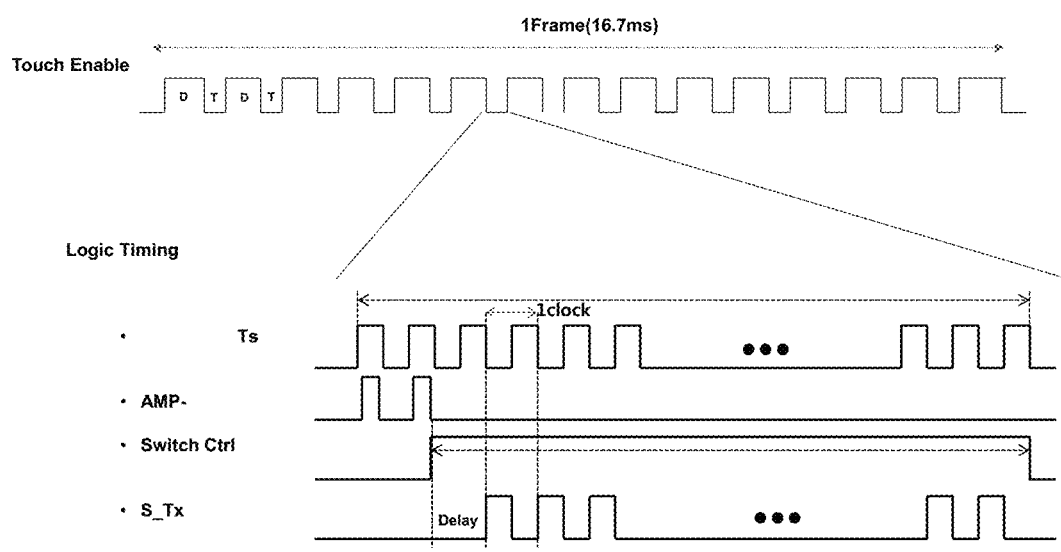
FIG. 13 is a timing diagram of signals used in inner configurations of the touchscreen and input pen illustrated according to the embodiment described with respect to FIG. 12.

FIG. 13 is a timing diagram of signals used in inner configurations of the touchscreen and input pen illustrated according to the embodiment described with respect to FIG. 12.

As illustrated in FIG. 13, the display panel 200, which includes the touchscreen, generates a touch enable signal for dividing each frame into a display period D and a touch period T, which alternate with each other at least one time for each frame. The touch period T corresponds to a low level of the touch enable signal, and the display period D corresponds to a high level of the touch enable signal. As illustrated in FIG. 13, one frame may be divided into several ten or more display periods D and several ten or more touch periods T. If necessary, one frame may be divided into two periods, namely, one display period D and one touch period T, as illustrated in FIG. 3.

The touchscreen generates a plurality of touchscreen driving signals Ts in each touch period T.

The input pen 100 again time-divides the touch period T in order to enable the receiving unit to execute pen sensing while enabling the driving unit 340 to output a pen driving signal S_Tx in an initial portion of the touch period T.

In this case, the input pen senses the touchscreen driving signal Ts, to use the touchscreen driving signal Ts for pen sensing. The amplifier 333 and comparator 335 in the receiving unit 330 generate outputs thereof in a high-level period of the touchscreen driving signal Ts.

Discrimination between the pen sensing signal S_Rx and the pen driving signal S_Tx in the input pen is achieved through control of the switching unit 320. A control signal for the switching unit 320 is generated from the signal processing unit 345. When a control signal "Switch Ctrl" for the switching unit 320 is shifted from a low level to a high level, the switching unit 320 switches from pen sensing to pen driving. In other words, the switching unit 320 stops transmitting touchscreen driving signal Ts from the conductive tip 310 to the receiving unit 330 and begins transmitting pen driving signal S_Tx to the conductive tip 310 from the driving unit 340. In such a switching period, the touchscreen driving signal Ts is delayed for one clock or more (e.g., one or more periods of the touchscreen driving signal Ts). The pen driving signal S_Tx is generated in sync with a falling edge or rising edge of a touchscreen driving signal Ts generated after the above-described delay, namely, a clock (e.g., a period or integer number of clock periods) of the touchscreen driving signal Ts. In this case, the touchscreen driving signal Ts and pen driving signal S_Tx are illustrated as having inverted waveforms in FIG. 13. That is, the pen driving signal S_Tx is generated in sync with a falling edge of the touchscreen driving signal Ts. The touchscreen driving signal Ts and pen driving signal S_Tx also have the same clock period. The touchscreen driving signal Ts and pen driving signal S_Tx may have inverted phases or the same phase, so long as they have the same clock period.

The delay in the switching period is preferably within one to two clocks of the touchscreen driving signal Ts.

Generation of the pen sensing signal S_Rx and pen driving signal S_Tx is repeated in the touch periods T of each frame. The pen sensing signal S_Rx is used for setting a timing synchronization signal for generation of the pen driving signal S_Tx. In general, the signal processing unit 345 divides a touch period T into at least one pen sensing period and at least one pen driving signal generation period. The signal processing unit 345 controls the switching unit 320 to transfer the pen driving signal S_Tx during the pen driving signal generation period and to transfer the touchscreen driving signal Ts during the pen sensing period. Practically, the a pen driving signal generation period within a touch period T is longer than a pen sensing period within the touch period Ts, so pen driving signal S_Tx is transmitted longer than the pen sensing signal S_Rx in order to achieve coupling of the input pen to the display panel including the touchscreen.

Hereinafter, waveforms of signals used for pen sensing in the constituent elements of the input system will be described.

In the illustrated case a two-stage inverting amplifier is used as the amplifier 333.

FIG. 14 is a waveform diagram illustrating outputs from the constituent elements of the receiving unit in the input pen according to the embodiment described with respect to FIG. 12.

As illustrated in FIG. 14, the touchscreen driving signal Ts generated from the touchscreen has a waveform having a constant period. However, the signal received to the receiving buffer 331 via the conductive tip 310 is a coupled signal, which is initially asynchronous while having a low value, so a load of the amplifier 333 is applied to the receiving buffer 331 in a reverse direction. As a result, distortion of the signal detected in the receiving buffer 331 may occur with passage of time.

The output from the receiving buffer 331 passes through the two-stage inverting amplifier 333 and is amplified while taking the form of an inverted signal.

The comparator 335 compares a final output from the inverting amplifier 333 with a threshold value, and inverts the output when the output has a level less than the threshold value. The comparator 335 then outputs the inverted signal as a digital pen sensing signal S_Rx.

It can be seen that, through the above-described configurations, the input system generates a pen sensing signal S_Rx, using a touchscreen driving signal Ts without generating a separate pen sensing signal at the inside of the input pen 100 and uses the generated sensing signal for pen sensing.

Meanwhile, the illustrated waveforms are results of a simulation conducted under the condition that the input pen 100 is in proximity but does not completely contact the touchscreen. When touch occurs actually, outputs of the receiving buffer 331, two-stage amplifier 333 and comparator 335 are varied at a time when the touch occurs. This variation is determined in the controller connected to the touchscreen when a pen driving signal S_Tx synchronized with a touchscreen driving signal Ts is generated, so touch may be detected.

Figure 15:
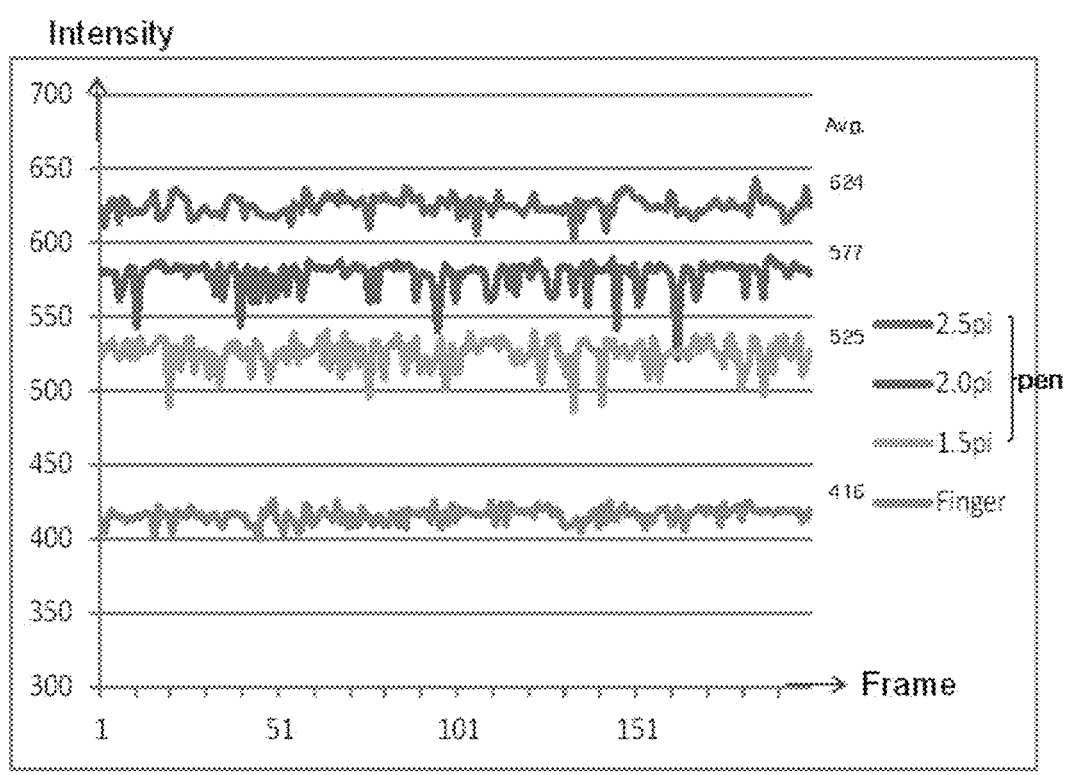
FIG. 15 is a waveform diagram illustrating sensitivity of a touch sensing signal sensed when the input pen contacts the touchscreen, as compared to use of a finger, according to an embodiment.

FIG. 15 is a waveform diagram illustrating sensitivity of a touch sensing signal sensed when the input pen contacts the touchscreen, as compared to use of a finger, according to an embodiment.

FIG. 15 illustrates measured intensities of signals sensed on a per frame basis when the input pen 100 included in the input system contacts the touchscreen and a signal sensed when a finger contacts the touchscreen. Referring to FIG. 15, it can be seen that the intensities of the signals sensed when the input pen 100 contacts the touchscreen is higher than that of the signal sensed when the finger contacts the touchscreen, and the intensities of the sensed signals increase as the capacitance coupled between the touchscreen and the conductive tip increases. Accordingly, it can be seen that, even when the input system including the input pen is used, detection of a signal having a level suitable for touch detection is possible.

In the input system, the conductive tip alternately performs a pen sensing function and a function of transferring a pen driving signal S_Tx, and generates a pen driving signal S_Tx synchronized with an operating frequency of the touchscreen based on a signal received during the sensing operation to use the pen driving signal S_Tx for touch detection. In this case, intensity of a touch signal may be increased through synchronization of a pulse operating in the touchscreen and a pen driving signal driven in the input pen 100 such as a stylus pen.

In addition, an input system having an in-cell type touchscreen and an input pen 100 driven in linkage with the touchscreen achieves better touch sensitivity compared to finger touch.

The above-described input system and touch detection method may provide one or more of the following example advantages.

The conductive tip of the input pen is used as a medium for receiving a touchscreen driving signal for the touchscreen in the display panel and a medium for transferring a pen driving signal generated at the inside of the input pen 100 without addition of a separate electrode to the display panel for driving of the input pen 100. Accordingly, it may be possible to achieve structure simplification while maintaining high sensitivity of touch sensing.

The input pen 100 does not independently generate a pen driving signal, but generates a pen driving signal based on a touchscreen driving signal Ts received by the input pen 100. Accordingly, it may be possible to accurately detect pen contact in a touchscreen driving period in order to accurately detect touch or proximity. Thus, realization of a highly sensitive input pen 100 may be possible.

In addition, linearity of touch detection may be maintained in order to enhance touch performance.

A sensing capacitor may be formed in accordance with the conductive tip included in the input pen 100 and the touchscreen, so signal calibration may be possible at the inside of the input pen. Accordingly, it is unnecessary to form an electromagnetic sensor in the display panel 200 for driving the input pen 100 in order to realize a touchscreen having a simple structure. In particular, the input system is useful for an in-cell type touchscreen structure.

Of course, the input system is not limited to the in-cell type touchscreen structure. The input system is applicable to any type of touchscreen, so long as the electrode structure of the applied touchscreen is of a capacitive type. The input system may also be applied to touchscreens using various touch detection methods. For example, the input system may be applied to a mutual-capacitance type touchscreen as well as a self-capacitance type touchscreen.

In the input system, the conductive tip alternately performs a pen sensing function and a function of transferring a pen driving signal, and generates a pen driving signal synchronized with an operating frequency of the touchscreen based on a signal received during the sensing operation to use the pen driving signal for touch detection. In this case, intensity of a touch signal may be increased through synchronization of a pulse operating in the touchscreen and a pen driving signal driven in an input pen 100 such as a stylus pen.

In addition, in an input system having an in-cell type touchscreen and an input pen 100 driven in linkage with the touchscreen, better touch sensitivity may be achieved as compared to finger touch.

It will be apparent to those skilled in the art that various modifications and variations can be made without departing from the spirit or scope of the inventions. Thus, it is intended that the present invention covers the modifications and variations of the disclosed embodiments provided they come within the scope of the appended claims and their equivalents.

What is claimed is:

1. An input system comprising:
   a display panel comprising:
     a plurality of sensing lines;
     a plurality of touch detection electrodes, each of the plurality of touch detection electrodes being independently connected to one of the plurality of sensing lines; and
     a touch sensing circuit connected to the plurality of sensing lines; and
   an input pen comprising:
     a conductive tip;
     a switching unit connected to the conductive tip;
     a receiving unit coupled to the switching unit and configured to receive a touchscreen driving signal from the display panel through the conductive tip and the switching unit;
     a driving unit coupled to the switching unit and configured to generate a pen driving signal transferred to the plurality of touch detection electrodes where the input pen contacts the display panel through the conductive tip and the switching unit;
     a signal processing unit coupled to the receiving unit and the driving unit, the signal processing unit configured to calibrate timing of the pen driving signal to synchronize the pen driving signal with the touchscreen driving signal such that generation of the pen driving signal overlaps with generation of the touchscreen driving signal; and a pressure sensor physically connected to the conductive tip to sense a pressure applied to the conductive tip and to transfer the sensed pressure to the signal processing unit, wherein the display panel is configured to detect contact or approach of the input pen in response to the pen driving signal.

2. The input system according to claim 1, wherein the touch detection electrodes are not overlapped each other.

3. The input system according to claim 1, wherein the driving unit is configured to generate the pen driving signal after a predetermined time elapses from reception of the touchscreen driving signal, and the conductive tip transfers the pen driving signal to the display panel.

4. The input system according to claim 3, wherein the signal processing unit is configured to initiate a switching period in response to reception of the touchscreen driving signal, the switching unit configured to begin transmitting the pen driving signal from the driving unit to the conductive tip after the switching period.

5. The input system according to claim 1, wherein the signal processing unit is configured to output the pen driving signal having a same period as the touchscreen driving signal and either a same phase as the touchscreen driving signal or an inverted phase relative to the touchscreen driving signal.

6. The input system according to claim 1, wherein the signal processing unit is configured to time divide a touch period of the display panel into a pen sensing period and a pen driving period, and the signal processing unit is configured to control the switching unit to transfer the touchscreen driving signal from the conductive tip to the receiving unit during the pen sensing period and to control the switching unit to transfer the pen driving signal to the conductive tip during the pen driving period.

7. The input system according to claim 6, wherein the pen driving period within the touch period is longer than the pen sensing period within the touch period.

8. The input system according to claim 1, wherein the receiving unit comprises:

an amplifier configured to amplify the touchscreen driving signal sensed through the switching unit; and a comparator configured to output a digital pen sensing signal having a digital level in response to a comparison of the amplified touchscreen driving signal from the amplifier to a threshold value, the driving unit configured to generate the pen driving signal in response to the digital pen sensing signal.

9. The input system according to claim 8, wherein the driving unit comprises a level shifter configured to convert the pen driving signal received from the signal processing unit into an analog drive voltage signal corresponding to a digital level of the pen driving signal, the level shifter configured to output the analog drive voltage signal.

10. The input system according to claim 8, wherein the comparator is configured to output the digital pen sensing signal in response to the amplified touchscreen driving signal being greater than or equal to the threshold value.

11. The input system according to claim 8, wherein the amplifier is an inverting amplifier, and wherein the comparator is configured to output the digital pen sensing signal in response to the amplified touchscreen driving signal being less than the threshold value.

12. A method for detecting touch using an input system, comprising:

providing a display panel including a plurality of sensing lines, a plurality of touch detection electrodes, each of the plurality of touch detection electrodes being independently connected to one of the plurality of sensing lines, and a touch sensing circuit connected to the plurality of sensing lines;

positioning a conductive tip protruding from an input pen to contact or approach the display panel;

receiving, via the conductive tip, a touchscreen driving signal from the plurality of touch detection electrodes where the input pen contacts the display panel in response to coupling of the conductive tip to the plurality of touch detection electrodes and sensing a pressure applied to the conductive tip;

generating, within the input pen, a pen driving signal synchronized with the touchscreen driving signal received from the plurality of touch detection electrodes such that generation of the pen driving signal overlaps with generation of the touchscreen driving signal; and transferring the pen driving signal to the plurality of touch detection electrodes where the input pen contacts the display panel via the conductive tip, the display panel configured to detect touch of the input pen in response to the pen driving signal.

13. The method according to claim 12, wherein the input pen repeatedly receives the touchscreen driving signal via the conductive tip and transfers the pen driving signal via the conductive tip, and wherein the input pen alternately receives the touchscreen driving signal and transfers the pen driving signal using time division at the conductive tip.

14. The method according to claim 13, wherein:

the display panel generates a touch enable signal for dividing each frame into the display period and a touch period, which alternate with each other at least one time per each frame;

the touchscreen generates a plurality of touch driving signals for the touchscreen during the touch period; and the input pen time-divides the touch period to receive the touchscreen driving signal during an initial portion of the touch period and to transfer the pen driving signal during a remaining portion of the touch period having a longer duration than the initial portion of the touch period.

15. The method according to claim 14, wherein receiving the touchscreen driving signal comprises:

receiving the touchscreen driving signal via the conductive tip;

amplifying the touchscreen driving signal using an amplifier of the input pen; and outputting a digital pen sensing signal having a digital level in response to comparing the amplified touchscreen driving signal with a threshold value, the pen driving signal generated in response to the digital pen sensing signal.

16. The method according to claim 15, wherein generating the pen driving signal comprises generating the pen driving signal at least one period of the touchscreen driving signal after outputting the digital pen sensing signal.

17. The method according to claim 12, wherein generating the pen driving signal comprises generating the pen driving signal having a same period as the touchscreen driving signal and either a same phase as the touchscreen driving signal or an inverted phase relative to the touchscreen driving signal.

18. The method according to claim 12, further comprising sensing a variation in capacitance of the plurality of touch detection electrodes, thereby detecting a touch position.

19. The method according to claim 12, wherein a common voltage signal is uniformly applied to the touch detection electrodes for touch detection during a non-touch period of the display panel.

20. The method according to claim 12, wherein there is one clock or more delay of the touchscreen driving signal in a switching period between completion of a pen sensing signal and the generation of the pen driving signal in the input pen.

* * * * *